Figure 1:
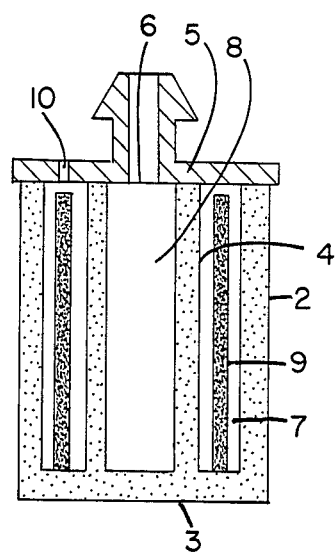

United States Patent [19]

Andreasson

[11] Patent Number: 4,763,632

[45] Date of Patent: Aug. 16, 1988

[54] FUEL COLLECTOR

[75] Inventor: Jan Andreasson, Mullsjö, Sweden

[73] Assignee: Scandmec AB, Mullsjo, Sweden

[21] Appl. No.: 872,286

[22] Filed: Jun. 10, 1986

[30] Foreign Application Priority Data

Jun. 10, 1985 [SE] Sweden .............................. 8502845
Jun. 10, 1985 [SE] Sweden .............................. 8502846

[51] Int. Cl.$^4$ ............................................ F02M 39/00
[52] U.S. Cl. .................................... 123/510; 123/514; 137/576
[58] Field of Search ............... 123/509, 514, 516, 510; 137/568, 571, 576–579, 585

[56] References Cited

U.S. PATENT DOCUMENTS

| | | | |
|---|---|---|---|
| 1,837,506 | 12/1931 | Tice | 123/510 |
| 2,945,509 | 7/1960 | Tuttle | 137/576 |
| 3,490,482 | 1/1970 | Sachs | 137/572 |
| 3,726,310 | 4/1979 | Coscia | 137/576 |
| 3,960,174 | 6/1976 | Latimer | 137/571 |
| 4,399,333 | 8/1983 | Liba | 123/516 |
| 4,503,885 | 3/1985 | Hall | 123/516 |
| 4,546,750 | 10/1985 | Brunell | 123/509 |
| 4,582,039 | 4/1986 | Nishida | 123/514 |
| 4,617,116 | 10/1986 | Seiler | 123/514 |

FOREIGN PATENT DOCUMENTS

| | | | |
|---|---|---|---|
| 1916565 | 10/1970 | Fed. Rep. of Germany | 123/514 |
| 2261394 | 7/1973 | Fed. Rep. of Germany | 123/516 |
| 5457442 | 11/1980 | Japan | 123/509 |
| 5560569 | 12/1981 | Japan | 123/509 |
| 0067960 | 4/1983 | Japan | 123/516 |
| 0119960 | 7/1983 | Japan | 123/514 |
| 0056162 | 4/1985 | Japan | 123/510 |
| 127113 | 1/1950 | Sweden | 137/585 |

Primary Examiner—Carl Stuart Miller
Attorney, Agent, or Firm—Dennison, Meserole, Pollack & Scheiner

[57] ABSTRACT

The present invention relates to a filtering fuel collector arranged inside a fuel tank to provide a running reserve fuel supply for a combustion engine when subjected to considerable g forces or while inclined. A running fuel reserve is obtained by making the fuel collector out of a porous, dimensionally stable material capable of supplying the collector with fuel when the engine is running.

6 Claims, 2 Drawing Sheets

FUEL COLLECTOR

The present invention relates to a fuel collector to provide a running fuel reserve for a combustion engine in which the fuel tank may be placed in positions preventing or making more difficult the supply of fuel. Examples of such applications are motor-saws, saws for land clearing, gardening machinery, boat engines, and so on, or in the fuel tanks of motor vehicles.

The problem of a reliable collector to provide a fuel reserve for motorsaws and the like during operation has been impossible to solve satisfactorily. When tilted, the engine is disturbed and may even stop entirely. Hitherto fuel reserves to last about 5 seconds have been achieved. Furthermore, the effect of g forces also constitutes a considerable problem in the case of motor-driven vehicles. The g force causes the fuel to be located briefly in one corner of the fuel tank, preventing the fuel pump from obtaining sufficient fuel. This problem has been solved previously by arranging wash plates, i.e. partitions, around the pump intake inside the fuel tank. Such wash plates are difficult to arrange in plastic tanks, particularly blown plastic tanks, neither are they always reliable. This also applies to container-like arrangements which are sometimes arranged inside fuel tanks of plastic.

The object of the present invention is to create a simple, inexpensive and reliable fuel collector which solves the above-mentioned problems. According to the invention this is effected in practice in that the collector comprises a body consisting wholly or partially of porous, dimensionally stable material capable of supplying the collector with fuel while the engine is running, said body having a single casing or several casing forming one or more chambers between the inner and the outer casing, an outlet for connection to the combustion chamber via a fuel pump being in communication with the inner container section and being provided with a valve.

Additional features of the present invention are revealed in the following claims.

Figure 2:
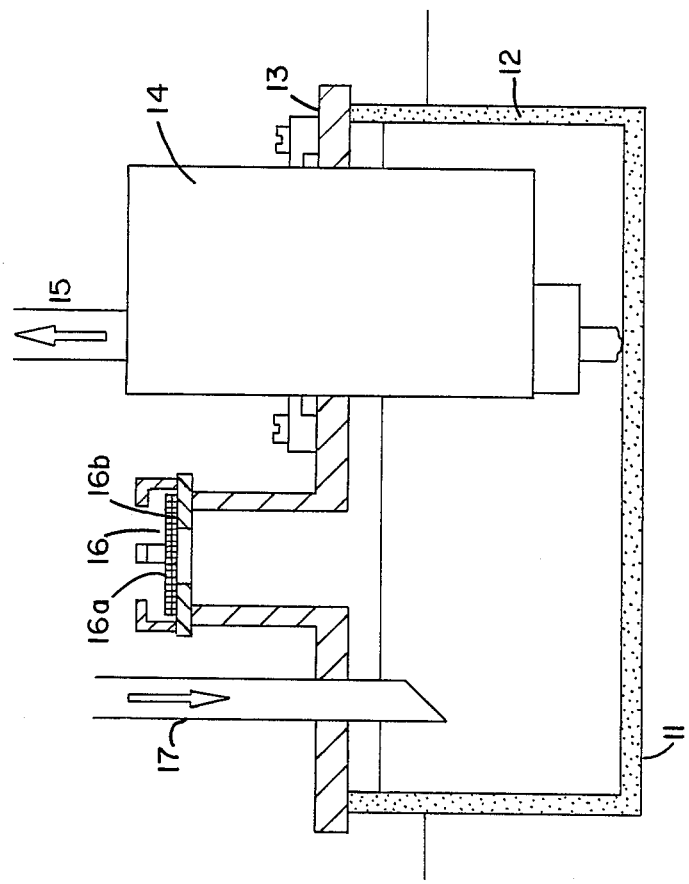

The present invention will be described in more detail in the following, with reference to the accompanying drawings in which FIG. 1 shows a vertical section through a fuel collector according to the invention, and FIG. 2 shows a vertical section through an alternative embodiment of the fuel collector according to the invention.

The fuel collector according to FIG. 1, arranged in a fuel tank, has a double casing and consists of an outer pipe-shaped wall 2. In the drawing this wall is cylindrical but its shape it optional, it having a substantially vertical longitudinal axis and a substantially flat, horizontal bottom 3. Inside said outer pipe-shaped wall 2 is an inner pipe-shaped wall 4, also cylindrical, arranged with its end section abutting the bottom 3. The inner cylindrical wall 4 is thus substantially coaxial with the outer cylindrical wall 2. Parts 2 and 4 may be welded to the bottom 3 or cast therewith. The cylindrical walls 2 and 4 and preferably also the bottom 3 are made of a porous material such as sintered polythene, the pore size being selected to suit the fuel in question so that they act as a self-priming filter. The pore size in the case of gasoline is preferably approximately 70 mu. This produces the "sugar-lump effect", the filter not easily releasing the fuel once it has been drawn into the porous material. The two cylindrical walls 2 and 4 are equal in length and a substantially flat, horizontal lid 5 in contact with these two parts, separates a cylindrical chamber 7 formed between the outer and inner walls 2 and 4 from an inner chamber 8 surrounded by the inner wall 4. A through-hole 6 is arranged in the lid 5, centered above the inner chamber 8. In the embodiment shown the lid 5 with aperture 6 comprises a tubular nipple, the nipple facing away from the fuel collector. To ensure that the fuel collector is in contact with the fuel in the tank a weight 9 is provided in the cylindrical chamber 7. This weight 9 consists of a piece of rolled sheet metal with a longitudinal opening running preferably parallel to the longitudinal axis of the chamber 7. During operation the fuel absorbed by the porous material gives the fuel collector extra weight.

The cylindrical chamber 7 and the inner chamber 8 are closed and do not therefore communicate with each other. When the fuel collector comes into contact with the fuel in the tank, the fuel is quickly drawn through the outer cylindrical wall 2, into the cylindrical chamber 7. The lid 5 is provided with a vent 10 above the cylindrical chamber 7 and this space therefore fills with fuel. In the embodiment shown, the vent has a diameter of 0.8 mm. The porous material, in this case sintered polythene, absorbs fuel more quickly than it enters through the vent and the outer cylindrical wall 2 thus also acts as a filter. The fuel is drawn through the porous material in the inner cylindrical wall 4, into the inner chamber 8, thus again filtering the fuel. The fuel reaches the combustion motor through the outlet 6. During operation of a motor-saw at an inclined angle the inner chamber 8 will empty the cylindrical section 7 of fuel before any disturbance of the fuel supply can occur. As long as part of the fuel collector is in contact with fuel in the fuel tank, the engine will run perfectly. The weight 9 in the cylindrical space 7 eliminates the risk of any abraded particles entering the carburettor, since the fuel is re-filtered upon passage through the inner cylinder wall 4. This fuel collector consists of few parts, has simple and reliable location of the weight and gives a running fuel reserve of about 30 seconds. The motor will run with very little disturbance and, when the tank has been emptied, the filtering fuel collector will be quickly refilled thanks to the vent.

FIG. 2 shows an alternative embodiment of a fuel collector located in a fuel tank 1. The collector is preferably arranged at the bottom of the fuel tank 1 to allow fuel to be supplied even when the tank 1 is running low. A recess may be provided at the bottom of the tank and the collector consists of a container of any suitable shape. The wall 12 is substantially vertical and in this case cylindrical, but may be shaped differently. The bottom 11 and wall 12 consist of porous material as in the previously example. The container is provided at the top with a lid 13 fitting tightly against the wall 12. A fuel pump 14 is provided in the lid 13 in such a way that the fuel is taken from the bottom of the container. The pump 14 and outlet 15 are preferably located centrally in the lid 13 but this is not essential. The lid 13 is also provided with a non-return valve 16 allowing air out of the container. The non-return valve is provided with a lid 16a, resting by its own weight to cover an aperture 16b. A supply pipe 17 is also provided in the lid 13 to convey return fuel from the injection motor back to the container. Any gas bubbles in the return fuel pass out through the non-return valve 16. The size and configuration of the container in this example are dependent on its application. If applied in a gasoline fuel tank, the collector according to the drawing is provided with a cylindrical wall about 45 mm in height, the bottom of the container having a diameter of about 110 mm. A container of these dimensions provides reserve fuel to keep the engine running for up to 30 seconds with a fuel consumption of 0.35 liter/km.

In the example shown, the pump 14, non-return valve 16 and supply pipe 17 are arranged in the lid 13. However, they may be located anywhere near the top of the container, e.g. at the top of the wall 12.

When the fuel penetrates into the chamber through the wall 12 and bottom 11, air present in the container will be released through the valve 16. The opening pressure of the valve must be close to zero, which is achieved by making it large in area. The valve 16 closes when the container has been filled with fuel. Any gas bubbles in the return fuel will also be released through the valve 16. When the fuel tank 1 is subjected to g forces, the fuel will remain in the container and supply the fuel pump 14 during the requisite time. When empty, the container will be quickly refilled with fuel penetrating in through the porous material. The container thus functions as a reserve volume in the fuel tank. Furthermore, the fuel is pre-filtered as it passes through the porous wall 12 and bottom 11. Other obvious advantages are: compact size, simple and inexpensive construction, no operating disturbance, easy application in various types of tanks.

The collector according to FIG. 2 is described for application in fuel tanks for motor vehicles. Of course it may also be used in other applications in which a liquid pump requires a continuous supply of liquid but there is a risk of brief interruptions in the flow. The size of the container and of the pores in the porous material must be adapted to the specific application. It has been shown that the hole 10 not always is necessary and for that reason might be omitted.

I claim:

1. A fuel collector for a combustion engine disposed within a primary fuel supply tank for said engine comprising, a collector body generally freely movable within said primary fuel supply tank and wherein at least a substantial portion of said collector body is formed of a dimensionally stable porous material for absorbing and retaining fuel provided by fuel in the primary fuel supply tnak, means defining at least on fuel chamber within said body for receiving retained fuel absorbed by and filtered by said porous material, means defining an outlet for said chamber through which fuel may be delivered to said engine, a vent communicating with the interior of said chamber to vent air from within said chamber and assist in refilling said collector, a weight in said chamber for maintaining said collector body in contact with the fuel within said primary fuel supply tank, the pore size of pores of said porous material be selected so as to act as a self-priming filter for a given fuel in said primary fuel tank, and wherein said chamber and said porous material provide a running fuel reserve of about 30 seconds for a combustion engine.

2. A fuel collector for a combustion engine disposed at least partially within a primary fuel supply tank for said engine comprising:

a collector body at least a portion of which is formed from a dimensionally stable porous material, means defining at least one fuel chamber within said body, means defining an outlet for said chamber through which fuel may be delivered to said engine, pump means associated with said collector for delivering a flow of fuel within said body to said engine and a check valve mounted on said collector and communicating with the interior thereof to vent air from within said chamber, characterised in that said porous material is selected from the group consisting of sintered plastic, polythene, or sintered bronze, having a pore size suited to the fuel in question.

3. A fuel collector for a combustion engine disposed at least partially within a primary fuel supply tank for said engine comprising, a collector body at least a portion of which is formed from a dimensionally stable porous material, means defining at least one fuel chamber within said body, means defining an outlet for said chamber through which fuel may be delivered to said engine, pump means associated with said collector for delivering a flow of fuel from within said body to said engine and a check valve mounted on said collector and communicating with the interior thereof to vent air from within said chamber characterised in that said porous material is selected from the group consisting of sintered plastic, polythene, or sintered bronze, having a pore size approximately 70 mu when the fuel in question is gasoline-based.

4. A fuel collector for a combustion engine disposed at least partially within a primary fuel supply tank for said engine comprising, a collector body at least a portion of which is formed from a dimensionally stable porous material, means defining at least one fuel chamber within said body, means defining an outlet for said chamber through which fuel may be delivered to said engine, fuel pump means (14) associated with said collector and located within said collector for delivering a flow of fuel from within said body to said engine and a check valve mounted on said collector and communicating with the interior thereof to vent air from within said chamber, said collector comprising a bottom (11) and at least one other wall (12) of said porous material, cover (13) sealed to said collector wall (13), a check valve (16) for the release of gases such as air or fuel vapour bubbles and excess fuel being sealingly arranged in or close to said lid connected to said chamber.

5. A fuel collector for a combustion engine disposed at least partially within a primary fuel supply tank for said engine comprising, a collector body at least a portion of which is formed from a dimensionally stable porous material, means defining at least one fuel chamber within said body, means defining an outlet for said chamber through which fuel may be delivered to said engine, pump means associated with said collector for delivering a flow of fuel from within said body to said engine and a check valve mounted on said collector and communicating with the interior thereof to vent air from within said chamber, wherein the collector body includes a double casting defining an outer, cylindrical side wall (2), a bottom wall (3) of said porous material, an inner cylindrical wall (4) of said porous material defining a second channel within said body, cover (5) positioned above the outer and inner cylindrical walls (2 and 4) so that the cylindrical chamber (7) formed between the outer and inner cylindrical walls (2 and 4), and the chamber (8) defined by the cylindrical wall (4) are closed and have no direct communication with each other, said cover including an outlet (6) above one of the chambers for connection to said engine and a vent (10) above the other chamber, said vent including a screen.

6. A fuel collector according to claim 5, wherein a weight is positioned in one of the cylindrical chambers (7).

* * * * *